W. G. DAVIS.
HEAD AND TAIL LIGHT CONTROL.
APPLICATION FILED APR. 13, 1912.

1,061,053.

Patented May 6, 1913.
2 SHEETS—SHEET 1.

Witnesses
M. F. Garnett
U. B. Hillyard.

Inventor
Willard G. Davis
By Victor J. Evans
Attorney

W. G. DAVIS.
HEAD AND TAIL LIGHT CONTROL.
APPLICATION FILED APR. 13, 1912.
1,061,053.
Patented May 6, 1913.
2 SHEETS—SHEET 2.
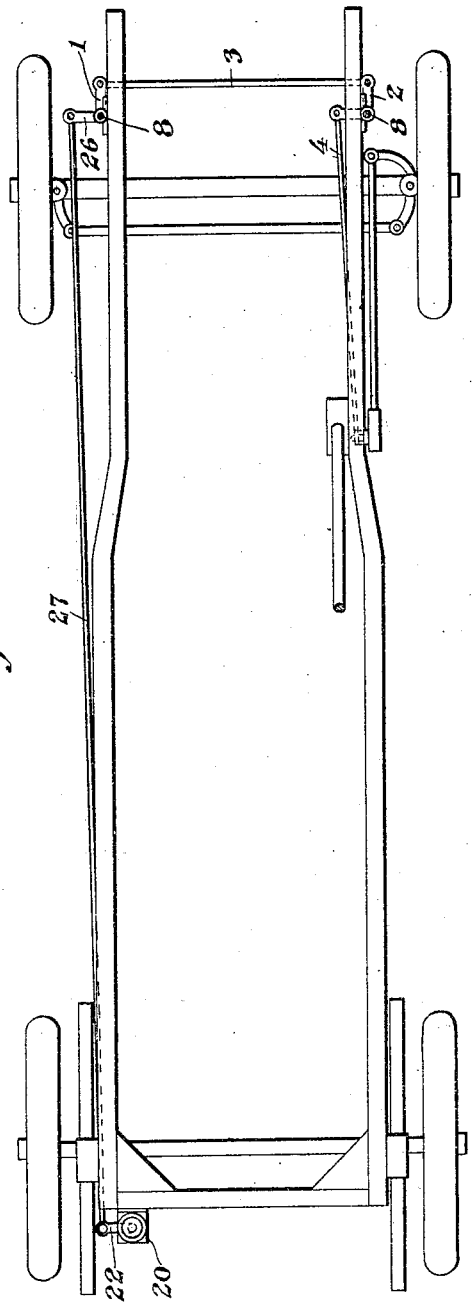
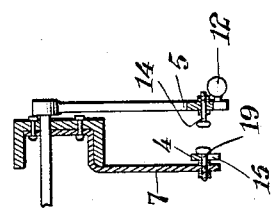
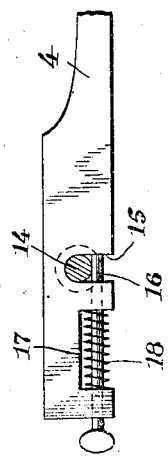
Witnesses
Inventor
Willard G. Davis
By Victor J. Evans
Attorney

UNITED STATES PATENT OFFICE.

WILLARD G. DAVIS, OF NICHOLASVILLE, KENTUCKY.

HEAD AND TAIL LIGHT CONTROL.

1,061,053.  Specification of Letters Patent.  Patented May 6, 1913.

Application filed April 13, 1912. Serial No. 690,552.

*To all whom it may concern:*

Be it known that I, WILLARD G. DAVIS, a citizen of the United States, residing at Nicholasville, in the county of Jessamine and State of Kentucky, have invented new and useful Improvements in Head and Tail Light Control, of which the following is a specification.

It is desirable in the operation of automobiles at night to have the roadway in advance of the machine lighted at all times and particularly is this the case when rounding curves or turning corners so as to prevent accident of any nature. It is also desirable to prevent the glare of the headlights from blinding the driver or operator of a machine or vehicle passing in the opposite direction.

The invention furthermore has for its object to inform the operator of a machine following another machine of the intention of the operator of the advance machine when a turn is to be made and the direction of the turn, thereby preventing the machine following from running into the machine ahead.

The foregoing advantages are attained by mounting the headlights and the tail light so as to turn and connecting them with the steering mechanism so as to move automatically with the steering wheels, hence when the machine is rounding a curve or turning a corner the rays of light are correspondingly deflected so as to illuminate the path in advance of the machine and to warn the operator of a following machine. Moreover when a machine turns aside to permit a vehicle or other machine to pass the rays of light are likewise thrown to one side of the roadway, thereby preventing the blinding glare to the operator of the passing vehicle or machine.

The invention provides a control for the headlights of an automobile or like machine or vehicle which may be readily applied to any make or type of machine without requiring any special construction of the parts, the control being of such a nature as to admit of its disconnection from the steering mechanism so that the headlights may remain stationary when operating the machine in daylight.

The invention consists of the novel features, details of construction and combination of parts, which hereinafter will be more particularly set forth, illustrated in the accompanying drawings, and pointed out in the appended claim.

Figure 1:
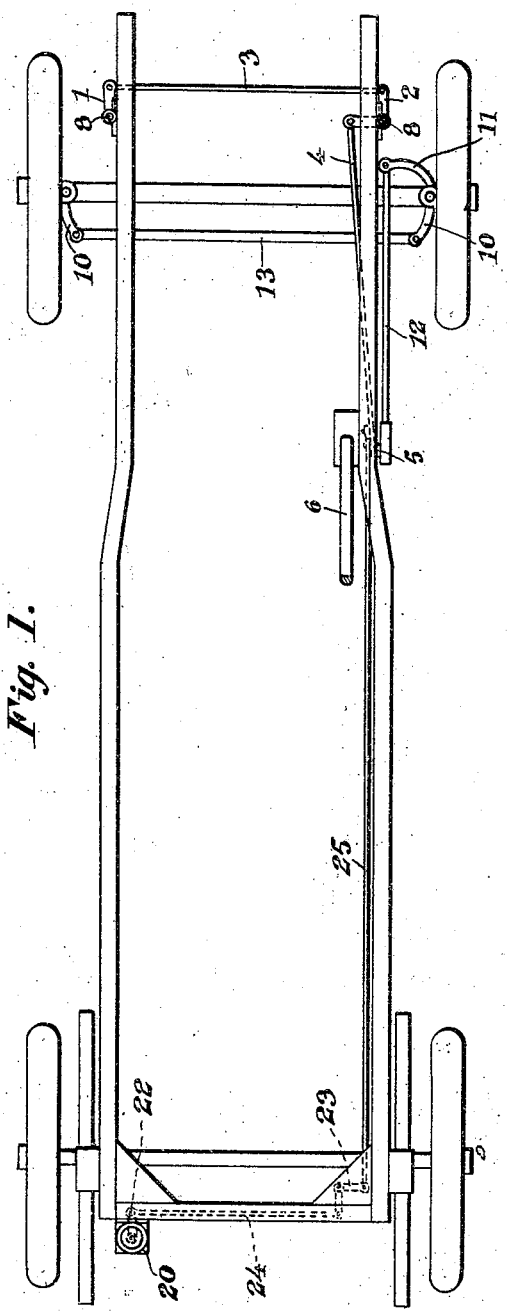
Figure 2:
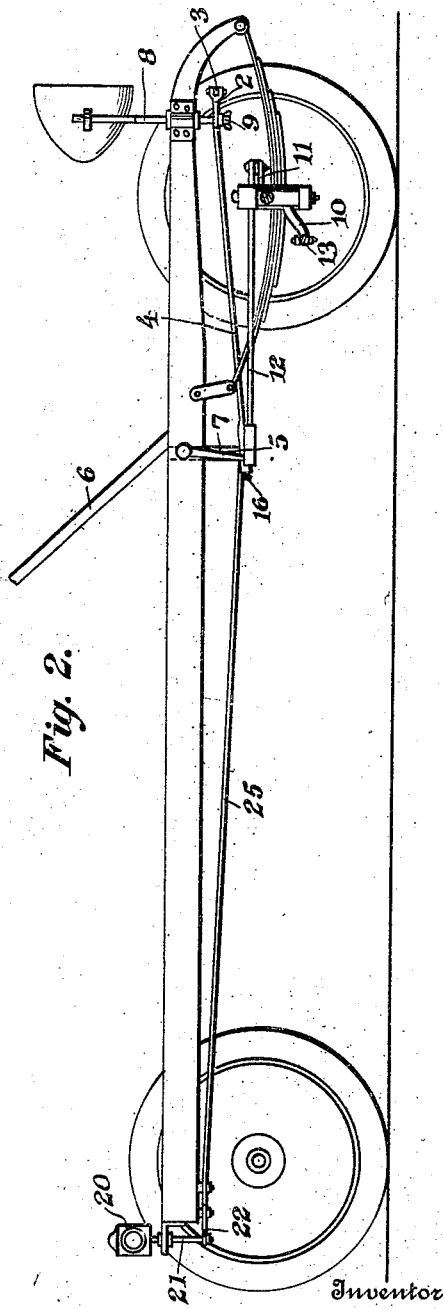

Referring to the drawings, forming a part of the specification, Figure 1 is a top plan view of the chassis of an automobile provided with headlight and tail light operating mechanism embodying the invention. Fig. 2 is a side view. Fig. 3 is a detail view of the rear end of the connecting rod, showing the means whereby the same is adapted to make detachable connection with the crank of the steering post. Fig. 4 is a detail view, showing the connecting rod attached to the bracket and disconnected from the crank of the steering post. Fig. 5 is a view similar to Fig. 1 of a modification.

Corresponding and like parts are referred to in the following description, and indicated in all the views of the drawings, by the same reference characters.

The operating mechanism or lamp control comprises an arm 1, a bell crank 2, a rod 3 for connecting the arm 1 with a member of the bell crank 2, a connecting rod 4 for coupling the other member of the bell crank to the crank 5 attached to the steering post 6, and a bracket 7, the latter adapted to be attached to a convenient part of the frame of the machine so as to receive the rear end of the rod 4 after the same has been disconnected from the crank 5. The arm 1 is adapted to be attached to the lower end of the stem of one of the lamp supports 8 and the bell crank 2 is adapted to be connected in a similar manner to the lower end of the stem of the other lamp support. The arm 1 and the bell crank 2 are formed with eyes to receive the stems of the lamp supports and threaded openings communicate with said eyes and receive set screws 9 by means of which the parts are made secure when in position and properly adjusted upon the lamp supports.

It is to be understood that the lamp supports 8 are mounted upon the frame of the machine so as to turn freely about their stems as axes.

Each of the steering knuckles has an arm 10 and one of the steering knuckles has a second arm 11 which is connected with the crank 5 by means of a rod 12. A rod 13 connects the two arms 10 so as to cause the spindles to move in unison. The steering mechanism is of ordinary construction. When adapting the invention to the headlights of an automobile or other vehicle the lamp supports are caused to turn in their bearings and the parts 1 and 2 are secured to the lower ends of their stems. The length of the connecting rod 3 must be such as to properly couple the arm 1 to a member of the bell crank 2 and the length of the rod 4 must be such as to couple the other member of the bell crank to the crank 5 of the steering post. The parts are so arranged that movement of the steering mechanism will effect a corresponding movement of the head-lights so that the rays of light may be thrown ahead of the machine when rounding a curve or turning a corner. When the machine is traveling in a direct line the headlights occupy a position to throw the rays of light straight ahead.

The rod 4 is adapted to make detachable connection with the crank 5 and for this purpose said crank is provided with a headed pin 14 and the rod has a lateral notch 15 near its rear end to receive the reduced part of the pin 14. The open end of the notch 15 is adapted to be closed by means of a latch 16 which is mounted in portions of the rod upon opposite sides of a recess 17, said latch being normally held projected across the notch 15 by means of a spring 18 mounted upon the latch and arranged within the recess 17, one end of the spring passing through an opening formed transversely in the latch 16 and the outer end obtaining a bearing against the rear end of the recess 17. The bracket 7 is secured to the frame of the machine in such a position as to have its free end, which is provided with a pin 19 similar to the pin 14, in line with said pin 14 when the headlights occupy a position straight ahead so that when the rod 4 is disconnected from the pin 14 and connected to the pin 19 the lamps will be held stationary and facing straight ahead. The outer portion of the bracket 7 is offset to move it away from the frame bar to which the bracket is attached and also to bring the pin 19 sufficiently close to the plane of movement of the crank 5 so that the rod 4 may be shifted from the pin 14 to the pin 19 or vice versa. When operating the machine in the daylight, or at such times when the headlights are not required for use, the rod 4 is disconnected from the steering crank 5 and coupled to the pin 19 of the bracket 7, but when it is required to move the headlights in the manner and under the conditions hereinbefore stated the rod 4 is coupled to the pin 14 of the steering crank 5 so that when steering the machine from a direct course the lamps are turned to throw the rays of light in the proper direction so as to illuminate the road ahead of the machine whether rounding a curve or turning a corner.

The tail light is indicated at 20 and is mounted so as to turn, the same being attached to a vertical stem 21 to which an arm 22 is connected in any manner. In the arrangement illustrated in Figs. 1 and 2 a bell crank 23 is mounted upon the frame of the machine and a rod 24 connects one member of such bell crank to the arm 22 and a rod 25 connects the other member of the bell crank to the rod 4. As a result of mounting the tail light and connecting the same to the rod 4 movement of the steering post 6 causes a corresponding movement of the tail light, hence the operator of a machine following another machine is enabled to ascertain when the operator of the machine in advance is about to make a turn and also to learn the direction of such turn, thereby avoiding accident.

In the construction shown in Fig. 5 the left hand lamp support is provided with a second arm 26 in addition to the arm 1 and a rod 27 connects the arm 26 with the arm 22 of the tail light, the connection being more direct and the construction being greatly simplified over that shown in Fig. 1, since a less number of parts are employed.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In headlight operating mechanism for automobiles and like vehicles, the combination of an arm connected with one of the side headlights, a bell crank connected with the support of the other side headlight, a rod connecting the arm with a member of the bell crank, a second rod connected with the other member of the bell crank, means for detachably connecting the second rod with the crank of the steering post or a pin mounted upon the main frame, and other means connecting the tail lamp with the steering post, such means embodying an arm, bell crank and connecting rods.

In testimony whereof I affix my signature in presence of two witnesses.

WILLARD G. DAVIS.

Witnesses:
B. WOLF,
ERNEST WATTS.